Dec. 7, 1943.    H. E. WURZBACH    2,336,434
FEED CONTROL SYSTEM
Filed April 29, 1942
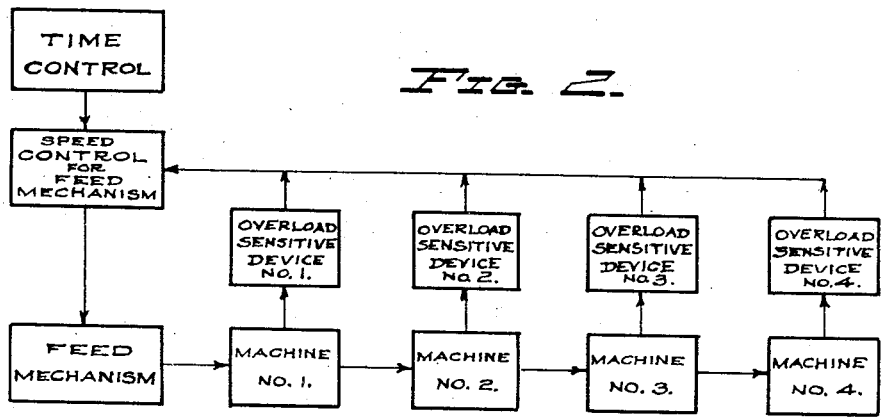
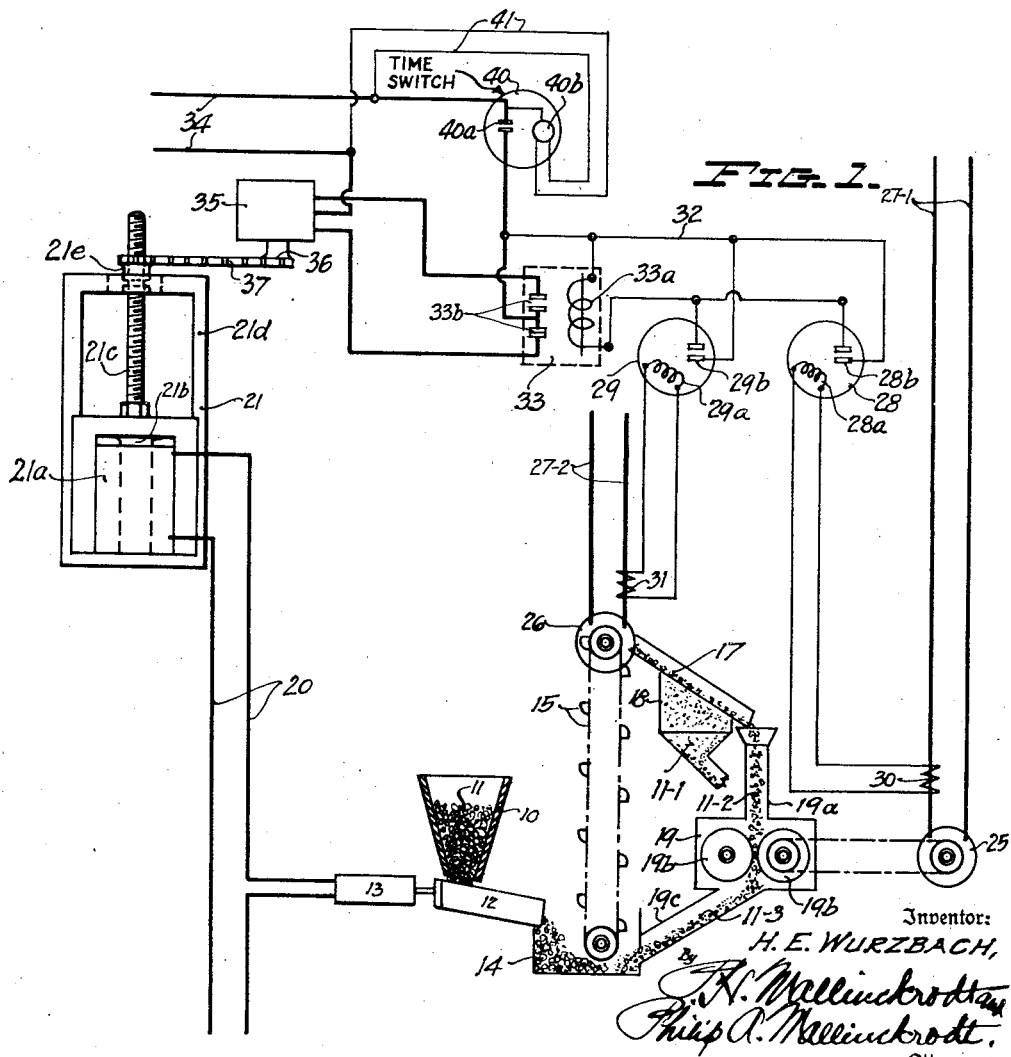
Inventor:
H. E. WURZBACH,
by
R. H. Mallinckrodt
Philip A. Mallinckrodt.
Attorneys.

Patented Dec. 7, 1943

2,336,434

UNITED STATES PATENT OFFICE 2,336,434

FEED CONTROL SYSTEM

Hugh E. Wurzbach, Magna, Utah

Application April 29, 1942, Serial No. 441,053

10 Claims. (Cl. 83—44)

This invention relates to control systems, particularly for regulating substantially continuous feed of material to material handling or treating plants.

The invention is especially useful as applied to plants where the material being fed for processing differs in character from time to time, as for instance, in ore-processing plants where the ore supplied to the plant often varies considerably in physical characteristics during the course of operation of the plant.

Among the principal objects of the invention are to provide:

First. For regulating the primary feed of material to a material handling or treating plant in such manner that the plant is operating at its maximum capacity at substantially all times, without risking failure of weaker parts thereof under extraordinary operating conditions.

Second. For automatically controlling the primary feed of material to a plant in such manner as to prevent the overloading of any one or more of a number of machines or other operative equipment units which constitute the material handling or treating system of the plant.

Third. For automatically regulating the primary feed of material to a plant in accordance with changes in certain characteristics of the material being fed.

Fourth. For intermittent, automatic, supervisory control which occurs at and during predetermined regular time intervals.

Fifth. An automatic control system which utilizes a minimum of control apparatus, is economical to construct and service, is rugged in construction, and is efficient and dependable in operation.

Many plants for treating or processing materials comprise several different types of machines or other operative equipment units arranged in series for successively operating from machine to machine or unit to unit upon the material fed to the plant. Each machine or piece of equipment may have its own particular maximum material-handling capacity, which varies from time to time depending upon variations in physical characteristics of the material supplied the plant during the course of its operation. The material-handling capacities of the respective machines may be quite different in the individual instances, which means that, to prevent overloading, the quantity of material fed to the plant at any given time should be no greater than the least of the several different maximum capacities existing at that given time for the various machines involved. On the other hand, where maximum output of the plant is desired, the quantity of material supplied should always be sufficiently great to load to maximum capacity the particular machine whose comparative maximum capacity is the least at the given time.

The invention is intended to provide for automatic regulation of the feed or supply of material to a material-treating plant in accordance with the above, that is to say, in such manner, that, regardless of variation in physical characteristics of the material supplied from time to time during the feed, the material-treating plant, considered as a whole, will always be operating without overload, and at maximum capacity as determined by the least of the comparative maximum capacities of the component machines of the plant. Thus, considered as a whole, the plant will always be operating at maximum capacity, but there will be no possibility of failure of the material handling or treating system because of unduly heavy loads being imposed on the weaker units of the system.

An outstanding feature in preferred structural embodiments of the invention resides in the provision of an electrical system of devices sensitive to overload conditions, such as magnetic float relays, actuated respectively, by the over-load electrical operating current of the various machines, and each operative, when so actuated, to effect a decrease in the rate of feed of material to the entire material-treating plant. The control system is so arranged that it will gradually increase the rate of feed until caused to decrease the same by reason of the actuation of one or more of the over-load responsive devices.

It will thus be seen that a material-treating plant operating under the influence of this embodiment of the invention, will gradually be supplied more and more material until one of the machines of the plant reaches its over-load point. At that instant, the over-load sensitive device associated with that particular machine will automatically effect a suitable reduction in the quantity of material fed to the plant as a whole.

Since each of the component machines of the plant is provided with an over-load sensitive device, each is capable of exercising the desired control over the entire plant.

It is desirable that a time switch be included in the control circuit for confining the automatic feed control to definitely predetermined and regular time intervals throughout the period of operation of the material-treating plant, a feature which is claimed broadly in my copending application for U. S. Patent, Serial No. 441,052, and entitled Automatic supervisory control system. This feature minimizes stresses and wear on both the material-treating and the control systems and enables the control to be most effectively accomplished.

Further objects and features of the invention will be apparent from the following detailed description of the preferred specific embodiment illustrated in the accompanying drawing.

In the drawing—

Fig. 1 is a wiring diagram including a diagrammatic representation of a preferred embodiment of the mechanisms of the invention arranged for controlling the feed of ore successively to a bucket elevator and to an ore crusher, arranged in series as a portion of an ore processing plant.

Fig. 2, a flow diagram illustrating the application of the invention broadly to a material handling or treating system consisting of a plurality of individual machines, for example, four.

The control system of the invention may be applied to advantage in a wide variety of material handling or treating plants for regulating the feed of material to the several machines, mechanisms, or apparatus involved in the series of operations through which the material must pass in being processed. It may take a variety of different forms, as will be apparent to those skilled in the art from a consideration of the generic concepts involved in the specific control system here illustrated and described in detail.

Referring now to the drawing which illustrates a typical ore-processing plant subject to control pursuant to the invention, the number 10 indicates a hopper from which rough, unsized ore 11 is drawn by a vibratory feeder 12, actuated by a conventional electric vibrating unit 13. The speed of vibration of the feeder 12 determines how much of the ore 11 is drawn from the hopper 10 in unit time.

From the feeder 12, the ore 11 passes into a boot 14, arranged to supply both raw and partly processed ore directly to a conventional bucket-type, endless belt elevator 15.

The elevated ore is discharged onto a screen 17, arranged over a bin 18, the fine particles thereof, indicated at 11—1, passing through the screen into bin 18 for storage, or if desired, for passage to other mechanical units of the plant, such as classifiers, ball mills, and the like (not illustrated). The coarser pieces of ore, indicated at 11—2, fall into the intake chute 19a of a roll-type crusher 19, and thence pass between crushing rolls 19b thereof. The resulting relatively fine ore 11—3 passes down the discharge chute 19c of the crusher and discharges into the boot 14 for elevation, along with the rough, unsized ore 11, to the screen 17 by means of the elevator 15.

In accordance with the invention, it is desired that neither the elevator 15 nor the crusher 19 operate under overloaded conditions during operation of the plant, although it is desired that the plant, considered as a whole, continuously run at its maximum capacity. Because the ore 11 supplied from hopper 10 may vary in character, some portions being harder than other portions, for instance, the maximum capacity of crusher 19, in terms of tonnage output of crushed ore, will vary considerably from time to time during plant operation. But, variation in tonnage output by crusher 19, should the crusher always be held to its maximum capacity, means considerable variation in load imposed upon elevator 15 by the crushed ore 11—3, a variation which may well result in overloading the elevator 15 under certain conditions of the ore 11, as, for instance, when portions of the ore are exceptionally soft and easily crushed. Under such conditions, the maximum carrying capacity of the elevator 15 provides the measure of, i. e., determines, the maximum operating capacity of the ore-processing plant as a whole. On the contrary, when the ore 11 is exceptionally hard, the maximum capacity of crusher 19 may be a relatively low tonnage output, a quantity which is only a fraction of that necessary to overload the elevator 15. Here, the overload condition in the crusher becomes the measure of, i. e., determines the maximum operating capacity of the ore-processing plant as a whole.

For controlling the feed of ore 11 from hopper 10, pursuant to the invention, it is preferred that the control instrumentalities be electrical in character and be operative upon the electrical circuit 20 supplying electricity to the electric vibrating unit 13.

For varying the voltage of the current supplied to the electric vibrating unit 13, and in turn varying the rate of feed of the vibratory feeder 12, a variable reactance device 21 is included in the circuit 20. The variable reactance may be of conventional design, comprising a coil 21a, provided with an iron core 21b which is movable up and down within the coil. A threaded stem 21c, extending upwardly from rigid connection with the core 21b, passes through the frame 21d, and through a threaded collar or sprocket wheel 21e which is rotatably secured to the frame 21d. The sprocket wheel 21e constitutes operative means to draw the stem 21c up and down and is driven as described hereinafter.

It is preferred that the crusher 19 and the elevator 15 be electrically powered, as by the electric driving motors 25 and 26, respectively, supplied with electricity from main circuits 27—1 and 27—2, respectively.

The overload-sensitive devices of the control system of the invention are, in this instance, actuated by the overload current in the respective main circuits 27—1 and 27—2, and as illustrated, comprise conventional magnetic float relays 28 and 29, respectively, but other types of relays may also be used.

Associated with the motors 25 and 26, and with the respective main supply circuits are electrical current transformers 30 and 31. The transformers 30 and 31 in turn are connected with the respective coils 28a and 29a of the magnetic float relays 28 and 29, and serve to energize the same under conditions of overload of the crusher 19 or of the elevator 15, respectively.

The single pole relays 28b and 29b of the respective float relays 28 and 29 are connected in an electrical circuit 32, common to both, and are normally in open position, as illustrated.

Also connected in the control circuit 32 is the magnetic coil 33a of a single pole, double throw, magnetic switch 33, which is adapted to be electrically energized whenever either or both of the relays 28b and 29b are closed.

The switch contacts 33b of the magnetic switch 33 are connected in an electrical circuit 34 with a reversible electric motor 35, whose drive shaft has a sprocket wheel 36 mounted thereon. The sprocket wheel 36 is connected by means of the chain 37 to sprocketed drive collar 21e of the variable reactance device 21, for rotating the same in whichever direction the motor is rotating.

The magnetic switch 33 is so arranged that those switch contacts 33b thereof which, when thrown together, cause motor 35 to rotate in a direction operative to change the variable reactance device so that greater voltage is supplied to the electric vibrator unit 13, and thereby a faster rate of feed to the ore-processing plant is produced, are normally thrown closed. Thus, when neither the elevator 15 nor the crusher 19 have reached their overload points, the feed of ore 11 to boot 14 will be increased, until, as determined by the character of the ore, either the elevator or the crusher reaches the overload point. At that point, the overload current of the particular drive motor 25 or 26 concerned, acting through its associated current transformer, either 30 or 31, will actuate its particular overload-sensitive device, either the magnetic float relay 28 or the magnetic float relay 29, to close electrical circuit 32, and to thereby change the condition of magnetic switch 33 so the normally contacting switch-contacts 33b are thrown out of contact, and those which are not normally in contact are thrown into contact. In this manner, motor 35 is reversed whenever a condition of overload in either of the machines of the plant is reached, the setting of the variable reactance device 21 is appropriately changed, and movement of ore-feeder 12 is decreased, resulting, of course, in lessening the quantity of ore 11 fed into boot 14, and thereby relieving the overload condition.

It can easily be seen that, should a ball mill, classifier, and other ore-processing equipment also form a part of the plant, a proportionate number of additional magnetic float relays could be connected into electrical control circuit 32 for enabling such equipment to share in determining the rate of feed of ore 11 to the plant as a whole.

It is advantageous that the increase in the rate of feed, up to the point where some machine of the system reaches an overload, be gradual, and also, that the control not be exercised so frequently as to place undue stresses on the feed mechanisms or on the control mechanisms themselves. Accordingly, it is preferred that regulation of the feed be confined to periods of suitable length which occur at predetermined regular time intervals.

For this purpose, a time switch 40 of conventional design may be connected into electrical circuit 34 so that the switch contacts 40a thereof, open and close such circuit 34 periodically, as determined by the setting of the time mechanism 40b. It is advantageous that the time mechanism be electrically driven, as by the electrical circuit 41.

Since the electrical circuit 34, which energizes the reversible control motor 35, is closed only periodically because of the time switch 40, there will be no decrease in the rate of feed, regardless of whether either magnetic relay 28 or magnetic relay 29 calls for same, except during those periods when the closing of the time switch contacts 40a permits. Likewise, there will be no increase in the rate of feed except during those periods when the closing of the time switch contacts 40a permits. The setting of the time switch 40 will vary in particular instances, and should always be such as will insure the greatest degree of protection to both the plant being controlled and the control system.

The invention is well set forth generically in the flow diagram of Fig. 2, which applies to a control system operative upon a material-treating system consisting of four machines. Since the invention is applicable to a plant consisting of practically any number of machines, the four machines of the flow diagram is an arbitrary number selected merely as an example.

As illustrated in Fig. 2, the four machines of the flow diagram are arranged in series and are operative, one after another, on a stream of material fed by the feed mechanism. An overload-sensitive device is associated with each machine, individually, and all the overload-sensitive devices are connected in parallel for individually or plurally acting upon speed control means associated with the feed mechanism. The time control, if provided, governs the control exercised over the feed speed control means by any one or more of the overload-sensitive devices.

The overload-sensitive devices may be well known instrumentalities designed to respond to whatever conditions indicate overload on the particular machines concerned. For example, certain machines indicate overload condition by excessive vibration. Under such circumstances, the overload-sensitive devices may be devices, electrical or otherwise, which are actuated by such vibration to cause the speed control for the feed mechanism to decrease the rate of feed to the machine as desired.

Whereas this invention is here illustrated and described with respect to specific embodiments thereof, it should be understood that many changes may be made in such specific embodiments and many other embodiments may be constructed by those skilled in the art without departing from the spirit and generic purview of the invention as set forth herein and in the claims that follow.

Having fully described my invention what I claim is:

1. The method of operating a material-handling plant in which is included a plurality of machines arranged for successively acting upon a primary feed of material that varies in character from time to time, and in which it is desired to maintain substantially maximum production without excessively overloading any of the said plurality of machines, comprising conducting a primary feed of material into the plant at a substantially constantly increasing rate; continuing to constantly increase the rate of said primary feed until such times as one or more of said machines reaches its overload point; appreciably decreasing the rate of said primary feed during such times as said one or more of said machines is at the overload point; and, thereafter, resuming the substantially constant increase in the said rate of feed.

2. The method set forth in claim 1, wherein the said constant increase in rate of feed and the said decrease in rate of feed are confined to time intervals occurring periodically in predetermined timed sequence.

3. In a system for automatically controlling the primary feed of material to a plurality of machines which are arranged for successively operating upon the material fed to the system, the combination of primary feed means; control means for increasing and decreasing the speed of operation of said primary feed means; means normally maintaining said speed control means in speed increasing condition, whereby the speed of operation of said primary feed means is normally substantially constantly increased; and overload-sensitive devices respectively associated with said plurality of machines and with said control means, said overload-sensitive devices being automatically operative, whenever the respective machines of said plurality of machines manifest overload, to place and maintain said control means in speed decreasing condition during the duration of said overload.

4. In a system for automatically controlling the primary feed of material to a plurality of machines which are arranged for successively operating upon the material fed to the system, the combination of overload-sensitive devices operatively associated with the said plurality of machines, respectively; means for controlling the rate of said primary feed; means for causing the said feed rate control means to substantially constantly increase the rate of said primary feed during normal operation of said machines; means whereby actuation of any of said overload-sensitive devices causes the said feed rate control means to appreciably decrease the rate of said primary feed; and means for confining the said increase and the said decrease in the rate of primary feed to time intervals occurring periodically in predetermined timed sequence.

5. In an electrical system for automatically controlling the primary feed of material to a plurality of electrically motivated machines which are arranged for successively operating upon the material fed, the combination of a plurality of normally open electrical relays corresponding in number to the number of said machines and electrically connected together in parallel; means associated respectively with said relays and adapted to be energized by overload current in the respective electrical supply lines furnishing current to said electrically motivated machines, said means being adapted when energized, to close their respectively associated relays; electrically motivated control means for increasing or decreasing the rate of said primary feed; and electrical means connected in circuit with said relays and adapted to normally cause said feed rate control means to substantially constantly increase the rate of said primary feed, said means being adapted to effect a decrease in the said rate when any of the said relays are closed.

6. In an electrical system for automatically controlling the primary feed of material to a plurality of electrically motivated machines which are arranged for successively operating upon the material fed, the combination of a plurality of normally open electrical relays corresponding in number to the number of said machines and electrically connected together in parallel; means associated respectively with said relays and adapted to be energized by overload current in the respective electrical supply lines furnishing current to said electrically motivated machines, said means being adapted when energized, to close their respectively associated relays; a device for effecting said primary feed of material to said machines; electrical motivating means for said feed device provided with a circuit for supplying electricity thereto; a variable reactance device connected in said supply circuit; electrical circuit means; a reversible electric motor connected in said electrical circuit means, said reversible motor being operatively connected to said variable reactance device for adjusting the same to either increase or decrease the voltage in the said supply circuit with which it is associated; electrical switch means connected in said electrical circuit means and normally thrown to energize said reversible motor in a direction to substantially constantly increase the voltage applied to said feed-device motivating means through said supply circuit; and electrical means in circuit with said relays and adapted to throw said switch means to energize the reversible motor in a direction to decrease the said voltage when any of said relays are closed.

7. In an electrical system for automatically controlling the primary feed of material to a plurality of electrically motivated machines which are arranged for successively operating upon the material fed, the combination in accordance with claim 6, but including in addition thereto, an intermittently operative time switch, the said time switch being connected in the said electrical circuit means for the purpose of confining the control exercised by the said reversible motor, to time intervals occurring periodically, in predetermined timed sequence.

8. In an ore-processing plant which includes electrically driven rolls, an electrically driven elevator for delivering ore to said rolls, an electrically driven ore feeding device arranged to feed ore to said elevator, and electrical supply circuits for supplying electricity to the respective devices, an electrical control system for automatically regulating the rate of operation of said ore feeding device, said control system comprising normally open relay means connected for energization by overload current in the circuit supplying electricity to said elevator; a second normally open relay means connected for energization by overload current in the circuit supplying electricity to said rolls, said relay means being electrically connected n parallel; a reversible electric motor; a double throw switch electrically connected in circuit with said motor; a variable reactance device connected in the circuit supplying electricity to said ore feeding device; means interconnecting said reversible motor with said variable reactance device to either increase or decrease the voltage effective on said ore feeding device, depending upon the direction of rotation of said reversible motor; and electrical means connected in circuit with said relay means for throwing said double throw switch oppositely to its normally thrown position whenever the relay circuit is closed by either of said relay means, said double throw switch being normally maintaining thrown in a manner which effects rotation of said reversible motor in a direction to cause said voltage to substantially constantly increase in the circuit supplying said ore feeding device.

9. In an ore processing plant, the combination set forth in claim 8, but including with the said combination, an intermittently operative time switch electrically connected in circuit with the said reversible motor for the purpose of confining the control exercised by the said reversing motor to time intervals occurring periodically, in predetermined time sequence.

10. In a system for automatically controlling the primary feed of material to a plurality of machines which are arranged for successively operating upon said material, the combination of means for increasing the rate of said primary feed substantially constantly throughout the duration of operation of said machine except at such times as any one or more of said machines manifests a predetermined condition of load; and means responsive to said manifestation, for automatically decreasing the rate of said primary feed during such times of predetermined condition of load.

HUGH E. WURZBACH.